US006500293B1

(12) United States Patent
Dexter

(10) Patent No.: US 6,500,293 B1
(45) Date of Patent: Dec. 31, 2002

(54) CONTACT ADHESIVE PATTERNS FOR SHEET STOCK PRECLUDING ADHESION OF FACING SHEETS IN STORAGE

(75) Inventor: William P. Dexter, Mobile, AL (US)

(73) Assignee: U-Seal, Inc., Ocean Springs, MS (US)

( * ) Notice: Subject to any disclaimer, the term of this patent is extended or adjusted under 35 U.S.C. 154(b) by 0 days.

(21) Appl. No.: 09/172,175

(22) Filed: Oct. 14, 1998

Related U.S. Application Data

(63) Continuation-in-part of application No. 08/671,205, filed on May 27, 1996, now Pat. No. 5,941,451.

(51) Int. Cl.[7] .......................... B32B 31/00; B32B 1/08; B65D 27/00; B41L 1/32; A47G 17/22

(52) U.S. Cl. ...................... 156/264; 156/227; 156/291; 229/92.1; 270/39.01; 270/39.05; 270/52.12; 270/52.09; 270/38.14; 270/58.34; 428/40.1; 428/42.1; 428/42.2

(58) Field of Search ................................ 156/227, 264, 156/291; 229/68.1, 69, 92.1, 92; 283/2, 5; 270/39.01, 39.05, 52.12, 52.09, 58.14, 58.34; 428/40.1, 42.1, 42.2

(56) References Cited

U.S. PATENT DOCUMENTS

| | | | | |
|---|---|---|---|---|
| 3,482,780 A | | 12/1969 | Johnson ...................... | 229/69 |
| 3,791,572 A | * | 2/1974 | Gendron ...................... | 229/69 |
| 3,916,051 A | | 10/1975 | Wakeman ...................... | 281/5 |

(List continued on next page.)

FOREIGN PATENT DOCUMENTS

| | | |
|---|---|---|
| DE | 3836795 | 5/1990 |
| GB | 1325802 | 8/1973 |
| GB | 2225766 | 6/1990 |

OTHER PUBLICATIONS

InfoSeal Competitive System Comparison, by Transkrit Corp. PO Box 500 Brewarwe, NY 10509–0500 Pub Date Unknown, 4 sheets.

*Primary Examiner*—Harold Pyon
*Assistant Examiner*—Michael C. Miggins
(74) *Attorney, Agent, or Firm*—Greenberg Traurig; Richard E. Kurtz, II

(57) ABSTRACT

The invention includes methods and products which use contact adhesives to secure separate sheets of multiple ply documents to form finished documents, such as integrated letters and envelopes, billing statements, invoices, etc. Sheet material for production of completed documents having plural plies is disclosed, the production of which includes the steps of providing a continuous web of material having sequential parts therealong, the sequential parts including a first part having a first and a second surface and a second part adjacent to the first part having a third and a fourth surface. Contact adhesive is applied to at least the first and second parts in patterns which preclude adhesive contact and bonding of adjacent facing surfaces of the first and second parts when the web is interfolded and the first and second parts are in registry but which permit adhesive contact and bonding of the first and second parts when separated and sequentially stacked.

15 Claims, 11 Drawing Sheets

U.S. PATENT DOCUMENTS

| | | | | | |
|---|---|---|---|---|---|
| 3,955,750 | A | | 5/1976 | Huffman | 229/69 |
| 4,277,016 | A | | 7/1981 | Wakeman et al. | 229/69 |
| 4,283,185 | A | * | 8/1981 | Woolston et al. | 493/15 |
| 4,380,315 | A | | 4/1983 | Steidinger | 229/69 |
| 4,589,590 | A | | 5/1986 | McGuire et al. | 229/92.8 |
| 4,738,391 | A | | 4/1988 | Wiseman | 229/80 |
| 4,768,810 | A | | 9/1988 | Mertens | 281/5 |
| 4,813,593 | A | | 3/1989 | Pennock | 229/69 |
| 4,817,860 | A | | 4/1989 | Shapiro | 229/80 |
| 4,951,864 | A | | 8/1990 | Dicker | 229/80 |
| 5,167,739 | A | | 12/1992 | Hutchinson et al. | 229/69 |
| 5,183,203 | A | | 2/1993 | Sanders | 229/300 |
| 5,193,850 | A | | 3/1993 | Lombardo | 281/2 |
| 5,238,178 | A | * | 8/1993 | Hutchinson et al. | 229/92.1 |
| 5,314,110 | A | | 5/1994 | Lombardo | 229/69 |
| 5,332,210 | A | * | 7/1994 | Silverberg et al. | 271/220 |
| 5,346,430 | A | | 9/1994 | Baxter | 462/2 |
| 5,360,159 | A | | 11/1994 | Perriman | 229/80.5 |
| 5,366,410 | A | | 11/1994 | Lombardo | 462/6 |
| 5,376,048 | A | | 12/1994 | Whiteside | 229/69 |
| 5,409,441 | A | * | 4/1995 | Muscoplat | 493/223 |
| 5,413,532 | A | | 5/1995 | Raby | 462/2 |
| 5,462,223 | A | | 10/1995 | Heinz et al. | 229/160.1 |
| 5,464,255 | A | | 11/1995 | Schildmeyer | 283/116 |

* cited by examiner

CONTACT ADHESIVE PATTERNS FOR SHEET STOCK PRECLUDING ADHESION OF FACING SHEETS IN STORAGE

This application is a continuation-in-part of U.S. patent application Ser. No. 08/671,205 filed May 27, 1996, now U.S Pat. No. 5,941,451, the entire disclosure of which is hereby incorporated by reference.

BACKGROUND OF THE INVENTION

1. Field of the Invention

The present invention relates generally to the printing and/or fabricating of sheets, and more particularly to a means for applying contact adhesive to the stock prior to the printing process in order to preclude the premature adhesion of adjacent sheets together prior to the printing process. The present invention enables the user to print and assemble such sheet stock (paper, etc.) using an adhesive which bonds with itself upon contact, rather than requiring the specialized equipment for heating, moistening, or applying pressure to a different type of adhesive to join the forms together. Yet, the patterns of applied adhesive to not allow facing or adjacent sheets to bond together prior to the printing process and the subsequent collating and assembly of the sheets.

2. Background and Related Art

The use of plural sheets for various business and other forms and documents has evolved to become a common procedure. Such forms often provide an original and one or more copies which are distributed to various parties, according to the accounting, tracking, or other system being used. Often, one sheet is folded to form an outer envelope, with a second (or additional) sheet(s) assembled therewith and folded therein. Accordingly, various printing, collating, and processing machines have been developed in order to enable businesses to construct, print, and distribute such multiple sheet forms and documents as required.

One common point required by all such documents, is some means of securing the various sheets together. This has in the past been accomplished by some type of adhesive which requires some actuation means (heat, pressure, moisture), or by mechanically crimping the individual sheets together. All of these sheet assembly means require some additional costly equipment over and above the printing, collating, folding, and bursting (document separating) equipment required for the production of such forms and documents.

An adhesive which would allow the individual sheets to be secured together automatically during the printing or collating process would be ideal, as the forms could be produced at considerably less cost by eliminating the need for an additional costly machine to supply the heat, pressure, moisture, or mechanical action required to secure the sheets together. The concept of using such a contact adhesive applied to the facing surfaces of a document to secure them together has been raised in the past. However, it has to this point proven unworkable, as the application of such adhesive prior to the printing process, causes the sheets to be bonded together prior to their being run through separate printing processes (e.g., document and cover sheet or envelope, etc.) and thus to be unusable for multiple sheet forms.

Accordingly, a need will be seen for some means of applying a contact adhesive, i.e., an adhesive which bonds automatically to an identical adhesive material applied to another article, to one or both sides of plural sheets of material, in a pattern or patterns which preclude contact between contact adhesive material on facing sheet surfaces of in-registry sheets. Yet, the contact adhesive matters should provide for the adhesion of selected sheets from different stock supplies, or non-adjacent sheets in the same stack or supply, as desired in order to secure the various sheets of a given form together automatically, thus saving the cost of specialized equipment serving to actuate other types of glues. A discussion of the prior art relating to the present invention, and its differences from the present invention, is provided below.

U.S. Pat. No. 4,277,016 issued on Jul. 7, 1981 to William R. Wakeman et al. describes an Envelope Assembly wherein identical patterns of a contact adhesive material are applied to facing surfaces of a multiple ply document. Some of the contact adhesive extends inwardly from the borders of the sheets, to grip an internal sheet therebetween to preclude its movement within the envelope formed by the outer sheets. Wakeman et al. are silent regarding the means used to keep the two outer sheets from sticking together prior to assembly, while they are stacked together in storage prior to the printing and assembly process. It would appear that the continuous feed sheets would require an additional adhesive application machine immediately prior to the assembly of the sheets. The present invention provides a non-congruent adhesive pattern for facing surfaces prior to printing, thus allowing the sheets to have the contact adhesive applied prior to printing and yet preclude the adhesion of the facing surfaces of adjacent sheets together during storage.

U.S. Pat. No. 4,738,391 issued on Apr. 19, 1988 to Robert F. Wiseman describes a Temporarily And Permanently Sealable Envelope Or The Like, wherein the flap of the envelope has two different types of adhesive applied thereto. The primary adhesive is a moisture activated glue, which provides a permanent seal when activated. A secondary tab includes an adhesive which secures to an adjacent surface by means of light pressure, as in a Post-It note or the like. This is not a traditional contact adhesive as defined in the present disclosure, as this adhesive does not require an identical adhesive material on the opposite surface to which it is to be secured. Moreover, Wiseman provides a release sheet to cover his adhesive tab until adhesion is desired. No means of precluding adhesion of the facing surfaces by means of offsetting the contact adhesive patterns is disclosed, as provided by the present invention.

U.S. Pat. No. 4,817,860 issued on Apr. 4, 1989 to Ruth Shapiro describes a Fragrance Releasing Envelope wherein a temporary adhesive includes microencapsulated fragrance mixed therein. Separating the temporary adhesive portions to open the envelope, ruptures the micro capsules and releases the fragrance. The envelope is sealed prior to use, with an end flap remaining open for the insertion of a card or other article into the envelope. This end flap is sealed using moisture activated adhesive, not a contact adhesive. No means is provided by Shapiro to preclude the stocking of the two temporary adhesive portions together before such adhesion is desired, as in the alternatingly staggered or offset contact adhesive patterns of the present invention.

U.S. Pat. No. 4,951,864 issued on Aug. 28, 1990 to David Dicker describes a One-Piece Mailer And Apparatus For Folding Same, using moisture activated glue along the lateral edges of the blank. Dicker notes the disadvantages of heat activated adhesives in non-impact printers (e.g., laser), wherein a great deal of heat is generated during the printing process. This can cause such glues to be activated, which can damage the printer as well as destroying the article being printed. The contact adhesives used in the carrying out of the present invention are safe for use in such printers, as any heat will tend to reduce their surface tack and thus further preclude any chance that they may adhere weakly to some other article than an identical area of contact adhesive. Dicker further recognizes the problem with preapplication of contact adhesive along the edges of such envelope blanks, as he addresses only adhesives activated by some active agent (moisture, heat, etc.). The present invention precludes any requirement for the costly and complex moisture dispensing apparatus of the Dicker disclosure, and is adaptable to the construction of envelopes similar to the envelope of the Dicker patent.

U.S. Pat. No. 5,183,203 issued on Feb. 2, 1993 to Raymond W. Sanders describes a Multiple Purpose Certified Mail Envelope Assembly, wherein one panel of the envelope is provided in a continuous feed web and separate second panels and return receipt cards are glued to each of the first panels. A moisture activated glue is used, as identical patterns of contact adhesive applied to one surface of the panels in an interfolded continuous feed web, would result in the alternating facing surfaces having the contact adhesive thereon, becoming stuck together during storage before processing and assembly into completed envelopes. The present invention, comprising alternating staggered patterns of contact adhesive application, could be applied to the Sanders envelope assembly to preclude the need for complex and costly moisture application equipment for moisture activated adhesive.

U.S. Pat. No. 5,346,430 issued on Sep. 13, 1994 to George Baxter describes Non-Impact Printing Of Business Forms From Continuous Webs Having Adhesive Coatings, wherein a continuous rolled web has alternating segmented glue lines applied laterally to the opposite surfaces thereof. The continuous web sheet forms the central sheet of a three ply sandwich of sheets, with the other two sheets being coated continuously along the glue lines. The purpose of the alternating segmented glue lines of the Baxter patent is similar to that of the present contact adhesive patterns, but as the individual sheets comprising the continuous web never contact one another with their corresponding surfaces (i.e., front surface to front surface, or back to back, as in interfolded sheets), Baxter provides only for different patterns on opposite surfaces of the sheet. The Baxter glue patterns are identical over each segment on the front surface thereof, and identical over each segment on the back surface thereof, since in rolled web material only the front surface of one layer is in contact with the rear surface of the next overlying layer. The same surfaces (i.e., the first or front surface) of each segment never contact one another, as in interfolded sheets. Thus, the Baxter adhesive patterns on opposite surfaces are never in registry with one another, where the adhesive patterns one embodiment of the present invention are in alternating registry with one another on every other segment or sheet of an interfolded continuous web or in a stack of separate sheets. Accordingly, if one were to take the rolled web of Baxter and stack the individual sheets in an interfolded stack, in accordance with one embodiment of the present invention, each of the facing first and opposite second surfaces would adhere to one another, due to their identical adhesive patterns, creating a solid mass of inseparable sheets. On the other hand, if the Baxter segments were separated and stacked with each front surface in contact with the back surface of an adjacent sheet (i.e, all sheets facing in the same direction), then none of the sheets could be adhered to any other sheet having the same orientation. Also, Baxter describes the use of heat or pressure activated adhesives, rather than the contact adhesive used in the present invention. The present invention precludes contact between adhesive areas on identical surfaces of adjacent segments of interfolded continuous sheets, by providing alternating adhesive patterns on every other segment unlike the identical pattern over the same surface provided by Baxter. The present invention is also applicable to stacks of separate sheets, unlike the Baxter adhesive pattern.

U.S. Pat. No. 5,366,410 issued on Nov. 22, 1994 to Leo Lombardo describes a Business Form With Transfer Tape And Repositional Adhesive, comprising a three ply document attachable to an appliance or other article. The document is assembled with permanent adhesive along the common periphery, with a pressure activated adhesive and machine therefor being described. Lombardo requires an adhesive which requires some activation means, as the adhesive lines are all in exact registry. The temporary adhesive means requires a release sheet, thus adding to the cost of the assembly. Lombardo is silent as to the possibility of using contact adhesive, and staggering the positions of the adhesive on the sheets in order to preclude their adhering together prior to final assembly.

U.S. Pat. No. 5,413,532 issued on May 9, 1995 to James M. Raby describes ID Cards For Impact And Non-Impact Printers, wherein a rolled web of sheet material is used as a backing for the adhesively removable attachment of ID cards thereto. Raby does not disclose any means for preventing the rolled material from adhering to itself, but only one surface is disclosed with any adhesive thereon. It would appear that if this surface were folded over on itself, as in interfolded sheets, the adhesive would cause the faces to stick together. However, Raby is not concerned with this.

U.S. Pat. No. 5,462,223 issued on Oct. 31, 1995 to Heinz Focke et al. describes a Process For Coating Glue Spot Rows And Strips Onto Longitudinally Extending Blanks For Hinge-Lid Packs And Blanks Produced Thereby. The glue is provided on only one surface of the blank, and no means is provided to alternate the glue pattern to prevent facing contact glued panels from adhering to one another, as in the present invention. This is not important to Focke et al., as the glue is applied to the blanks during the manufacture of the packs, rather than beforehand, as in the present invention. Focke et al. are silent as to the type of glue used, but contact adhesive, as used in the present invention, would not work in the Focke et al. pack as no corresponding adhesive is applied to mating surfaces thereof, as would be required for a contact adhesive.

U.S. Pat. No. 5,464,255 issued on Nov. 4, 1995 to John Schildmeyer describes a Folded Business Form With Return Envelope, comprising a specially folded continuous feed sheet which is glued along the edges thereof to form the finished document. Contact adhesives cannot be used in the construction of the Schildmeyer form, as three of the four sections of each sheet segment used to form each document, have peripheral glue lines in registry with one another. Thus, adjacent sheets, or sections of sheets, would adhere to one another when stored in an interfolded stack if contact adhesive were to be used. The glue pattern used by Schildmeyer is identical on each document; no stagger is provided to preclude the gluing together of adjacent forms.

British Patent Publication No. 1,325,802 published on Aug. 8, 1973 describes Improvements Relating To The Sealing Of Waxes Fibreboard Containers, wherein a hot melt type glue is used to seal the container. The invention does not relate to contact adhesives, as the glue is only applied to points on one surface of the major flaps of the container in its flat, unfolded state. No mating adhesive is applied to the corresponding contact points on the minor flaps, to which the major flaps are sealed using the hot melt glue. The art of fiberboard containers is considerably removed from the printing of multiple ply documents, and such container blanks are not interfolded together as is the paper or other sheet material incorporating the present adhesive pattern invention.

Finally, British Patent Publication No. 2,225,766 published on Jun. 13, 1990 describes Self-Adhesive Label Strips wherein the labels are provided in a continuous sheet on a backing sheet having peripheral sprocket feed holes for a tractor feed printer. The invention is an incomplete separation between each of the labels, thus preventing label from starting to peel from the backing sheet as it is processed through the printer, due to its connection with the adjoining labels on each side. The labels are secured to the backing sheet by a releasable adhesive, rather than being permanently bonded by contact adhesive, as used in the present invention. As the adhesive is captured between the backing sheet and the label, it is not exposed and thus the sheet cannot adhere to itself if it is interfolded. No relationship is seen to the present invention.

In addition to the above, the present inventor is aware of various different forms supplied by different manufacturers, and equipment for processing such forms. An example is the Transkrit InfoSeal™ system, which is used with equipment produced by the Pitney Bowes Company. This system uses a remoistenable (water activated) adhesive to seal the various forms provided, and requires a special folder or burster to be used with the system, which is capable of applying moisture to the glue. While a conventional folder may cost around $300 and up, a specialized device to apply moisture to such forms using remoistenable glue will cost on the order of $8,000 to $30,000. The present invention of contact adhesive patterns, when applied to forms typically processed in these machines, eliminates need for specialized and costly moisture applicators for such remoistenable glues, while still assuring that the forms will remain separated until they are deliberately assembled in final form.

Other systems which are used in the industry are the Moore Business Forms Sealermate™ and Standard Register ThermoBond™, both of which utilize heat activated adhesives. The equipment required to heat the pre-applied adhesive is quite costly ranging from $8,000 and up. Also, the heat activated glues used in such equipment are toxic.

An alternative is pressure activated glues, as used in the Moore Business Forms and Uarco Pressure Seal systems. Again, the systems require additional specialized and costly equipment, on the order of $8,000 and up just to seal the forms.

Some systems use a specialized machine to apply a liquid glue to the forms during the folding and sealing process, rather than using forms which have had the adhesive pre-applied. An example of such equipment is made by Uarco, under the name Glue Seal™, and costs on the order of $30,000. Another device serving to apply the glue at the time of folding and sealing the documents is sold under the name GluFold™, is quite costly to purchase and maintain, with initial purchase costs ranging from $45,000 to $75,000.

In addition, forms pre-manufactured as mailing pieces prior to being printed with variable information by computer, such as Poser Business Forms, "Fast Tab™", Moore Business Forms' "Speedimailer™" and others are manufactured at the factory as a mailing piece with a face sheet as part "1" with a carbon spot on the back of part "1" to image the name and address only on the face sheet of part "2" (face of outgoing envelope). Insert(s) require at least one more ply. This type of product cannot be produced as a 1-part form. The part "1" (face) sheet is decollated; since, in many cases, its sole purpose is to image the impact printer of the name and address to part "2" (face of out-going envelope), this type of pre-manufactured mailing piece is typically 3–10 times as expensive to produce, requires carbon, carbon spot(s), or carbonless paper, requires numerous coating and collating operations and often special papers. Since the image of the outgoing envelope must be a carbon copy impression of some kind, it is often weak and will smear. The bar code, if smeared, will be cause the mailing piece to be rejected at the post office. The pre-manufactured mailing piece ordinarily must be printed-on from a computer impact printer, and cannot be printed-on by an ink jet or laser printer.

The reason so many different systems have been developed is that, to this point, no suitable means has been developed to provide for the application of a contact adhesive to such forms, thereby allowing the forms to be sealed together without need for additional equipment or pre-manufactured mailers, while still precluding the adhesion of the forms to one another in their stored state prior to printing and collating. The present invention provides for the application of self-adhering contact glues to sheets and forms prior to their printing and use, and may be used with virtually any of the printing, collating, folding, and bursting equipment of any of the above manufacturers without need for additional costly gluing equipment.

None of the above art, taken singly or in combination, is seen to describe the instant invention as claimed.

SUMMARY OF THE INVENTION

Accordingly, it is a principal object of the invention to provide improved contact adhesive patterns for sheet stock, precluding adhesion of facing sheets while in storage.

It is another object of the invention to provide staggered or offset contact adhesive patterns on like surfaces of alternating sheets of material in an interfolded stack, so that adhesive material from one sheet is not in registry or contact with adhesive material from the facing sheet in the stack.

It is a further object of the invention to provide identical adhesive patterns on every other sheet, so that alternating sheets in a stack may be secured together, either in an interfolded stack or in a stack of separate sheets, and to provide means for differentiating different patterns from one another, by color or other means.

An additional object of the invention is to provide identical adhesive patterns on different stacks of sheets, so that corresponding sheets in a first stack may be secured to like sheets in a second stack.

Still another object of the invention is to provide a means of forming multiple ply documents and forms comprising but not limited to letters, statements, and other similar printed matter, using the present contact adhesive patterns.

Yet another object of the invention is to provide a method of forming such multiple ply documents wherein the need for such equipment as gluing and sealing devices, is obviated.

It is an object of the invention to provide improved elements and arrangements thereof in an apparatus for the purposes described which is inexpensive, dependable and fully effective in accomplishing its intended purposes.

The invention according to a preferred embodiment includes methods and products which use contact adhesives to secure separate sheets of multiple ply documents together to form finished documents, such as integrated letters and envelopes, billing statements, invoices, etc. Sheet material for production of completed documents having plural plies is disclosed, the production of which includes the steps of providing a continuous web of material having sequential parts therealong, the sequential parts including a first part having a first and a second surface and a second part adjacent to the first part having a third and a fourth surface. Contact adhesive is applied to at least the first and second parts in patterns which preclude adhesive contact and bonding of adjacent facing surfaces of the first and second parts when the web is interfolded and the first and second parts are in registry but which permit adhesive contact and bonding of the first and second parts when separated and sequentially stacked.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
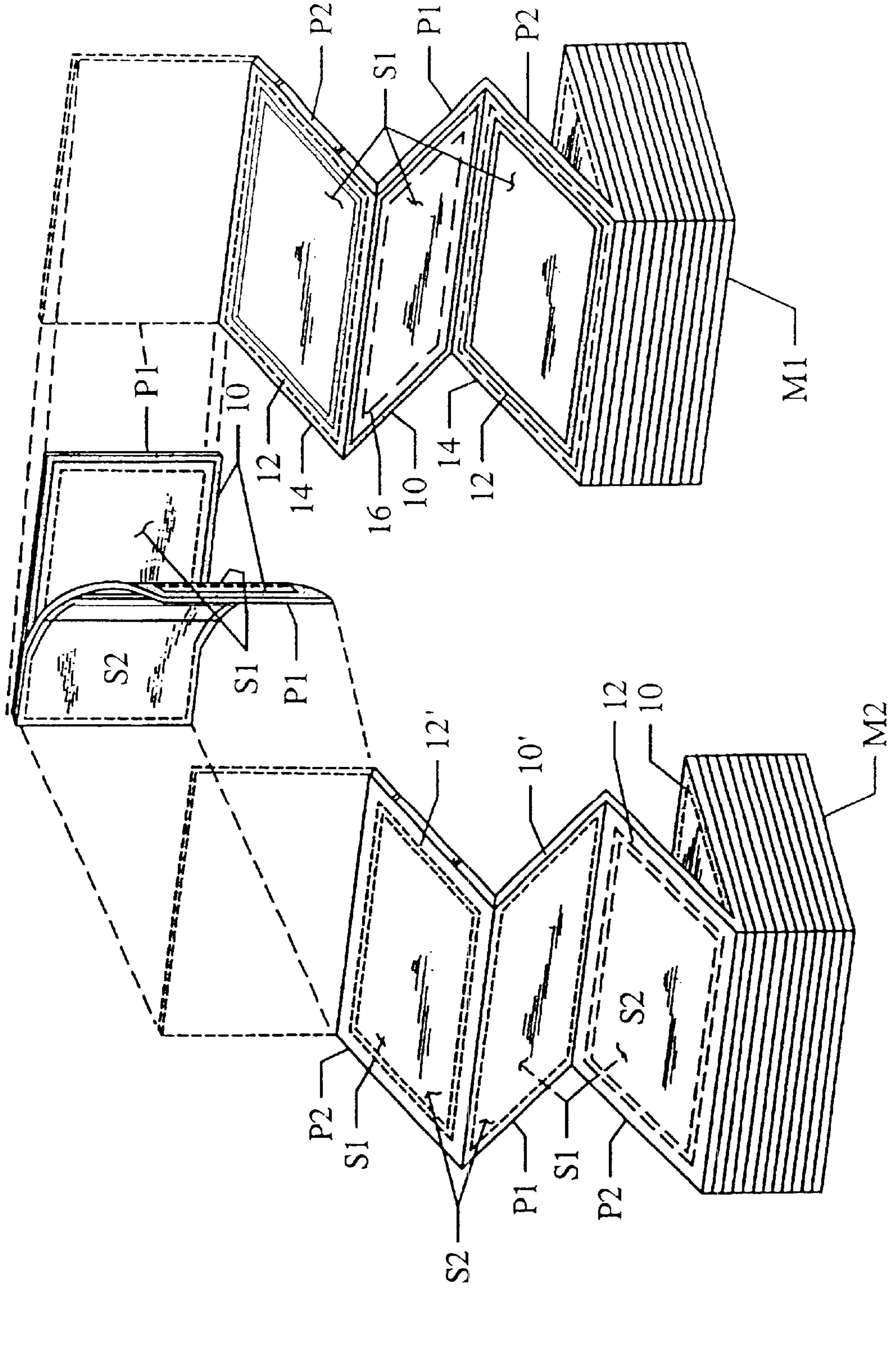
FIG. 1 is a perspective view of a first and a second stack of interfolded continuous feed sheets, showing the alternating contact adhesive patterns on facing sheets, and the identical patterns on ever other sheet to provide for the securing of corresponding sheets from one stack with another.

The present invention comprises various embodiments of patterns of contact adhesive which may be applied to sheet stock material (printed forms, etc.), which patterns are offset or otherwise spaced or separated to preclude adhesion of facing sheets until the sheets are finally collated for final assembly. Throughout the present disclosure, the terms "contact adhesive" and "contact glue" mean adhesives in which two articles to be joined, are each coated with the contact adhesive, with the identical adhesives self bonding together when the two articles are placed together. Heretofore, contact adhesives were not used in the paper or printing industry for the assembly of multiple sheet documents and the like, as the stacked sheets would bond together prior to the printing, collating, and final assembly process. Instead, adhesives requiring some additional form of activation (water, heat, pressure) have been used, which adhesives require an additional expensive component in the process.

The present invention is particularly well adapted for use in paper sheets fed through a tractor feed printer. Such sheets are conventionally provided with removable margins having sprocket feed holes therealong. These sprocket feed margins will be understood to be a part of the sheets used with the present invention, but are omitted in each of the drawing figures, in order to provide clarity in the drawings and to eliminate any possibility of confusion with the various contact adhesive patterns shown.

Figure 2:
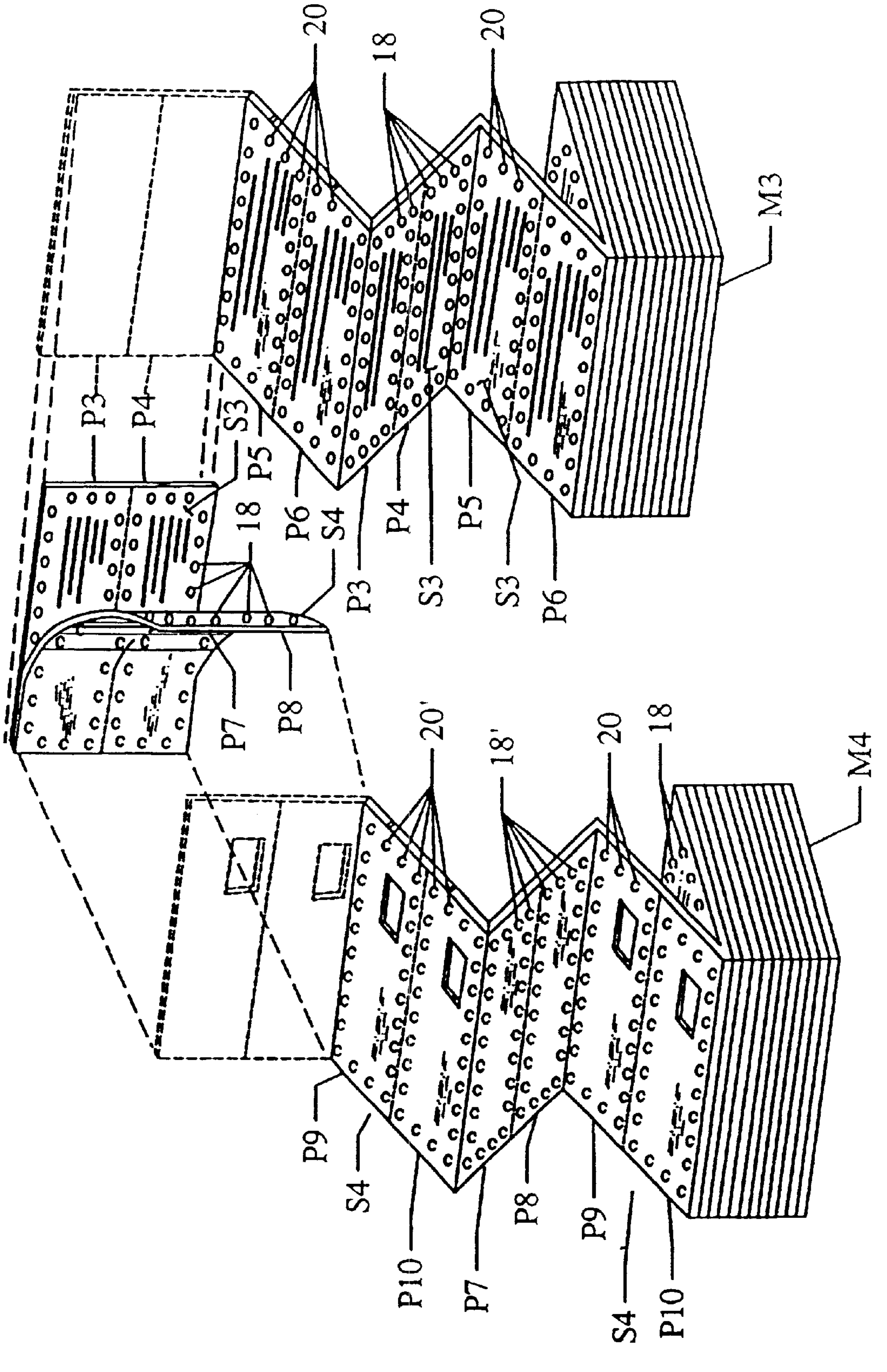
FIG. 2 is a perspective view showing the merging of sheets of a first stack comprising envelope faces, with a second stack comprising contents, and the securing of corresponding sheets together using like adhesive patterns, to form completed documents.

FIGS. 1 and 2 disclose one embodiment of the present invention, in which first, second, third and fourth continuous and symmetrical contact adhesive patterns, designated as 10, 12, 10' and 12', are applied to one surface of alternating sheets or plies P1 and P2 of a plurality of connected, interfolded, continuous feed sheets of material having two sides or surfaces S1 and S2 (paper, etc.). The first pattern 10 and third pattern 10' are applied to the first surface SI of each of the first sheets or panels P1, with the second pattern 12 and fourth pattern 12' being applied to the first surface S1 of the alternating second sheets or panels P2.

The first pattern 10 and third pattern 10' are identically disposed immediately adjacent the periphery of each sheet or panel P1 of the first surface S1, with the alternating second pattern 12 and fourth pattern 12' disposed identically slightly inwardly from the extreme edge of each second sheet or panel P2 on the first surface S1. Their opposite contact areas are designated as 14 where the first glue patterns 10 and 10' disposed on the first sheets or panels P1 contacts the second panel P2, and 16 where the second adhesive pattern 12 of the sheets P2 contacts its respective opposite panel P1, on each first surface S1. Thus, no adhesion will occur between facing sheets S1, as the adhesive areas 10 and 12 are only in contact with the respective opposite sheet material areas 14 and 16, and not with one another, due to their non-registry with one another when the sheets are stacked in registry. (It will be understood that the patterns 10, 12, 10' and 12' of FIG. 1 are exemplary. Any number of patterns, continuous or discontinuous, symmetrical or asymmetrical, in any form, may be used. Further examples are disclosed in other drawing figures.)

Accordingly, by providing an identical supply of interfolded sheets, designated as M2 in FIG. 1, the corresponding contact adhesive patterns 10 and 12 disposed upon the first surface S1 of each panel or sheet P1 and P2, will automatically bond to the like patterns 10' and 12' of the panels P1 and P2 of the first stack M1, when the two continuous feed stacks M1 and M2 are collated with one another, with the corresponding sheets or panels P1 and P2 in registry with their like counterparts in each stack M1 and M2 to form a completed multiple ply document.

FIG. 2 discloses a variation on the above embodiment, wherein each sheet or panel of the continuous feed interfolded stacks M3 and M4 is divided into two sub panels or sections, designated respectively as P3 and P4 for the first and second sections of each first sheet of the stack M3, and as P5 and P6 for the first and second sections of each second sheet of the stack M3. Such a configuration is often used in the construction of mailers, wherein each of the sections P3/P4/P5/P6 of the first supply M3 has a message printed thereon, and the corresponding sections P7/P8/P9/P10 of the second stack M4 is used as the outside or face of a mailing envelope. The resulting mailers will be on the order of five and one half inches in height, when each eleven inch sheet is separated along the lines of weakness (perforations, etc.) dividing the corresponding portions P3 and P4, P5 and P6, P7 and P8, and P9 and P10.

Each of the panels P3/P4 and P7/P8 will be seen to have a plurality of regularly spaced contact adhesive spots 18 and 18' distributed evenly about their respective peripheries, with the first sheet panels P3/P4 of the continuous feed message supply M3 having the adhesive 18 disposed upon the first surface S3 thereof, and the corresponding first sheet panels P7/P8 of the cover supply M4 having the adhesive 18' distributed on the corresponding mating first surface S4 of the cover stack M4. The other panels P5/P6 of the message stack M3, and panels P9/P10 of the cover stack M4, have adhesive spots 20 and 20' distributed about their respective peripheries on their respective first surfaces S3 and S4.

It will be noted that while each of the adhesive spots 18 distributed on each of the portions P3/P4 of the message stack M3, and on each of the mating portions P7/P8 of the mating cover stack M4, are arranged in a four by ten pattern about the peripheries of each of the portions P3/P4/P7/P8, the other adhesive spots 20 and 20' of the panel portions P5/P6/P9/P10 have a three by nine peripheral configuration. Thus, each of the adhesive spots 20 and 20' of the panel portions P5/P6 and P9/P10 will always fall between a pair of the spaced apart adhesive spots 18 and 18' on the panel portions P3/P4 and P7/P8. When these panels are interfolded in registry, with the panels P3/P4 in direct contact with the panels P5/P6, and the panels P7/P8 in direct contact with the panels P9/P10, no adhesion will occur, as the adhesive areas 18 and 20 will not be in registry with one another and adhesive areas 18' and 20' will not be in registry with one another.

When the two continuous feed sheets M3 and M4 are fed through a printer and collated, the corresponding panels P3/P4 and P7/P8 are brought together, and their mating adhesive spots 18 will bond together to seal the first surfaces S3 of the panels P3/P4/P7/P8 together. In a like manner, the in registry adhesive spots 20 and 20' of the panels P5/P6 and P9/P10 will bond together, to secure those portions of the sheets M3 and M4 together. The adhesively secured panels P3/P7, P4/P8, P5/P9, and P6/P10 may then be separated using a burster or other appropriate means, to form a plurality of completed mailers, with message portions and cover portions.

Figure 3:
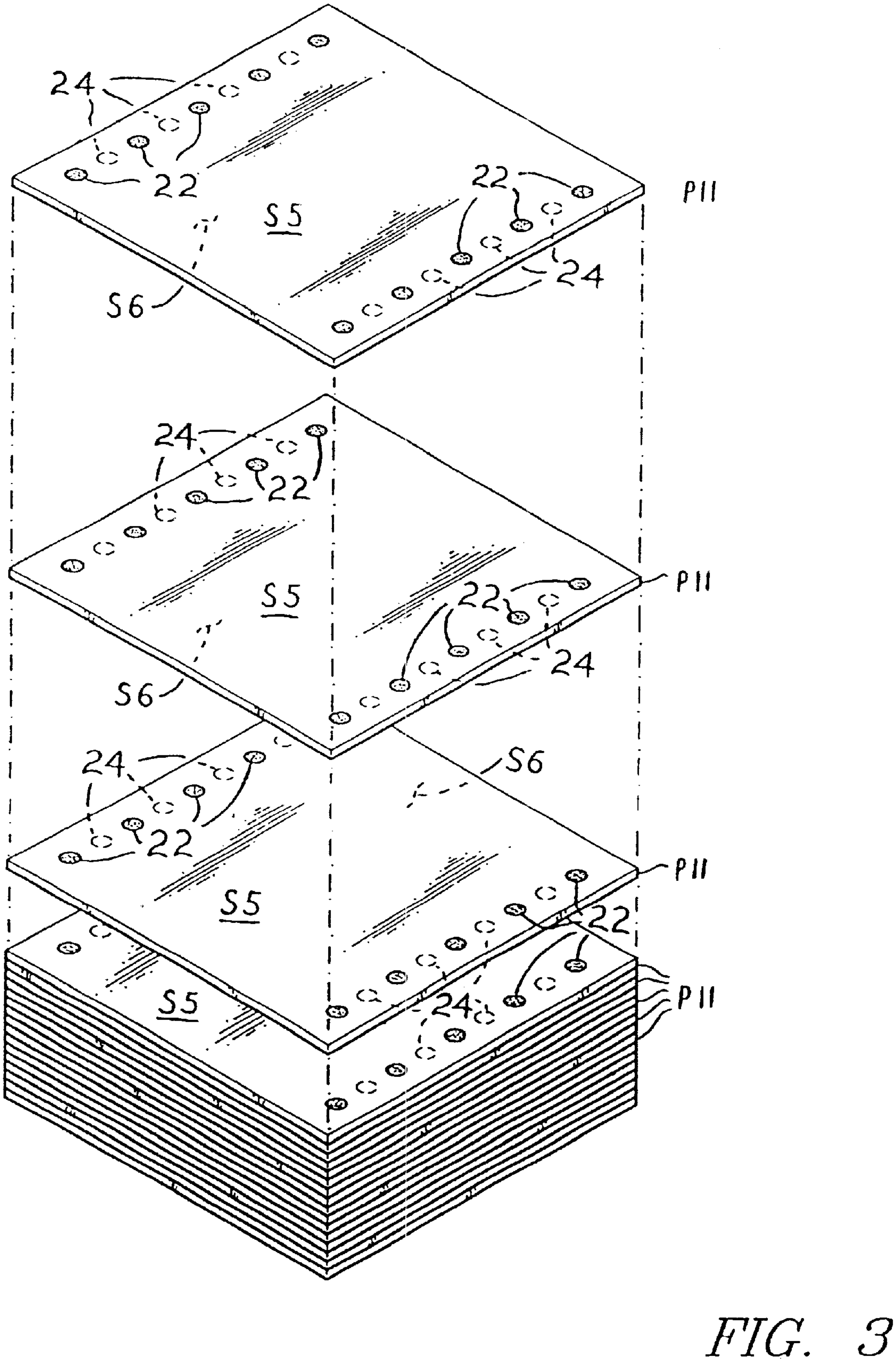
FIG. 3 is an exploded perspective view of a plurality of separate sheets, showing a first adhesive pattern on the upper surface of each sheet and the corresponding location of an optional different second adhesive pattern on the lower surface of each sheet, with the second pattern and first pattern being in non-registry with one another.

FIG. 3 discloses a variation on the above invention, where an adhesive pattern 22 is provided on the first surface S5 of each sheet P11 of a stack of separate identical sheets P11, each having a first surface S5 and an opposite second surface S6. The pattern 22 may comprise a plurality o separate spots, as shown or a continuous peripheral border as on the sheets or panels P1 and P2 of FIG. 1, or other pattern as desired. The important point here is that the contact adhesive pattern 22 is disposed only upon the first or upper surface S5 of each sheet P1. As the sheets P11 are stacked with each of their upper surfaces S5 being places adjacent the opposite lower surface S6 of an adjacent sheet, no adhesion will occur. However, it is also possible to provide a second pattern 24 of contact adhesive on the opposite second surface S6 of each of the sheets P11, with the second pattern 24 being in non-registry with the first pattern 22 when the sheets are stacked in registry.

Thus any two of the sheets P11 may be assembled with their first faces S5 together, by means of the identical adhesive patterns 22 disposed thereon. The adhesive pattern 24 placed on each of the second surfaces S6 of the sheets P11 may be used to assemble the sheets P11 together with their second surfaces S6 facing one another, if desired. This alternating arrangement may be used to build up a multiple ply document, merely by inverting every other sheet P11 in the stack, whereupon each sheet P11 would have a first surface S5 in contact with the first surface of an adjacent sheet with their identical adhesive patterns 22 securing the sheets together, and with each second surface S6 being secured to an adjacent S6 surface of an adjacent sheet.

Figure 4A:
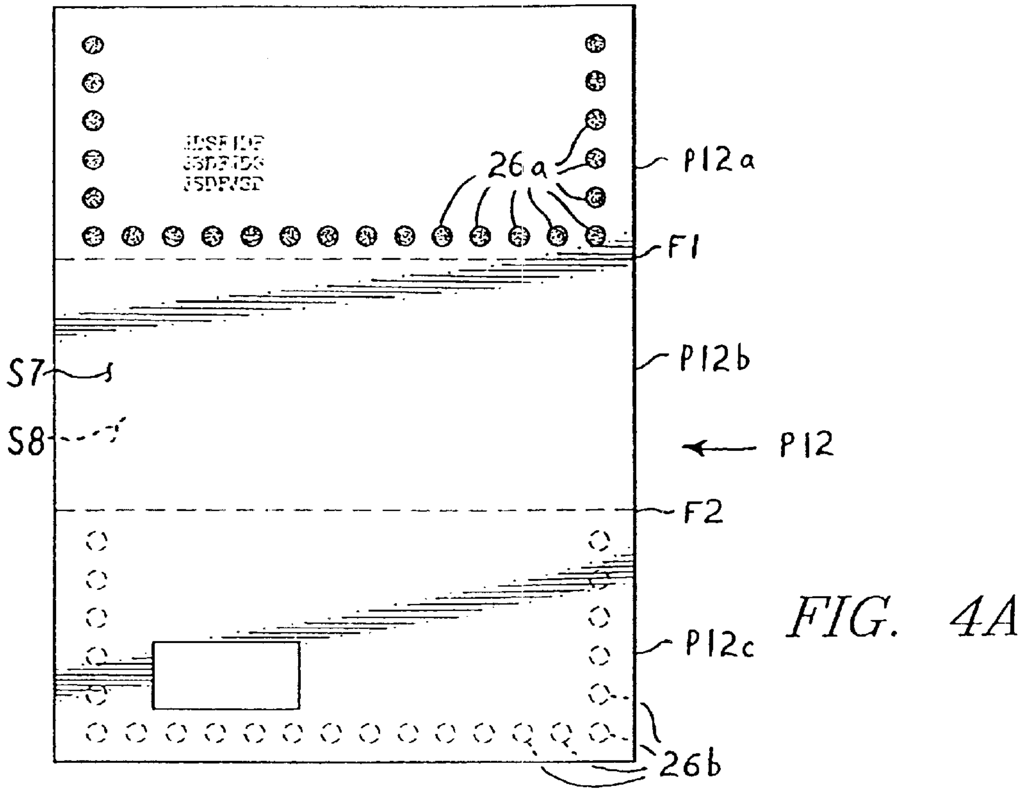
FIG. 4A is a plan view of a single sheet or form having different adhesive patterns on opposite surfaces thereof and adapted to form a three ply document.
Figure 4B:
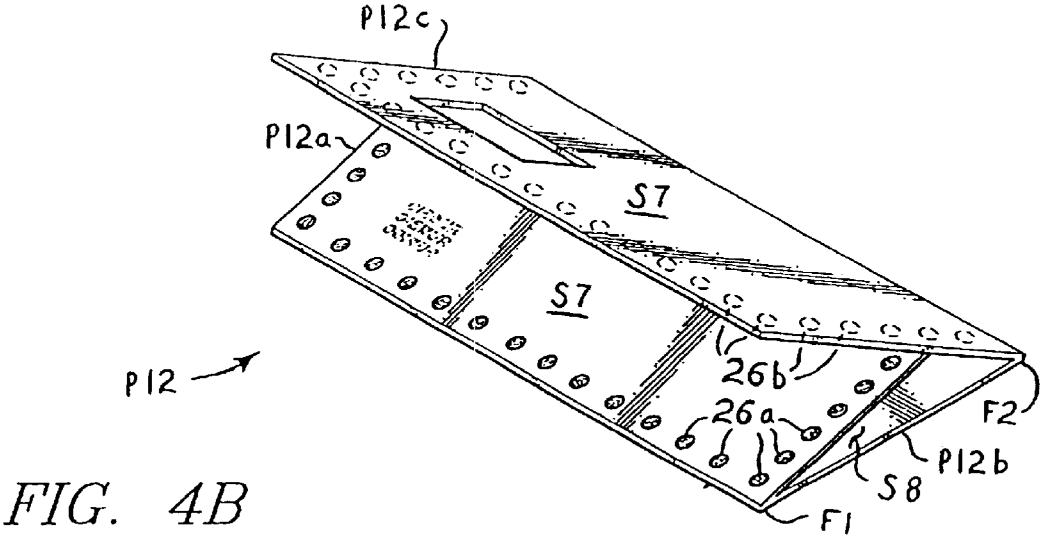
FIG. 4B is a perspective view showing the folding of the sheet of FIG. 4A to form an seal the document.

FIGS. 4A and 4B show a further embodiment adaptable for use with separate sheets or with continuous feed interfolded sheets, as desired. The embodiment of FIGS. 4A and 4B disclose contact glue patterns which may be used to form C folded mailers or the like, each having three panels when folded together. The unfolded sheet P12 of FIG. 4A is divided into an upper, a center, and a lower portion, respectively P12*a*, P12*b*, and P12*c*, with a first fold line F1 between panels P12*a* and P12*b*, and a second fold line F2 between panels P12*b* and P12*c*. The sheet P12 has a contact adhesive pattern 26*a* disposed upon the first surface S7 of the first panel P12*a*, and an identical adhesive pattern 26*b* on the opposite second surface S8 of the third panel P12*c*. However, the pattern 26*a* has a lateral peripheral line of adhesive adjacent the first fold line F1, while the pattern 26*b* has the corresponding line adjacent the sheet edge.

The completed mailer is formed by folding the first panel P12*a* over the second panel P12*b* along the first fold line F1, toward the second surface S8 of the sheet. The third panel P12*c*, with its address opening or glassine address window, is then folded over the folded P12*a*/P12*b* sheets with its second face S8 overlying the first surface S7 of the panel P12*a*, as in FIG. 4B. The adhesive pattern 26*b* provided on the second surface S8 of the third panel P12*c*will then be in registry with the corresponding adhesive pattern 26*a* of the first surface S7 of the first panel P12*a*, to seal the folded document for mailing or other processing as needed.

Figure 5:
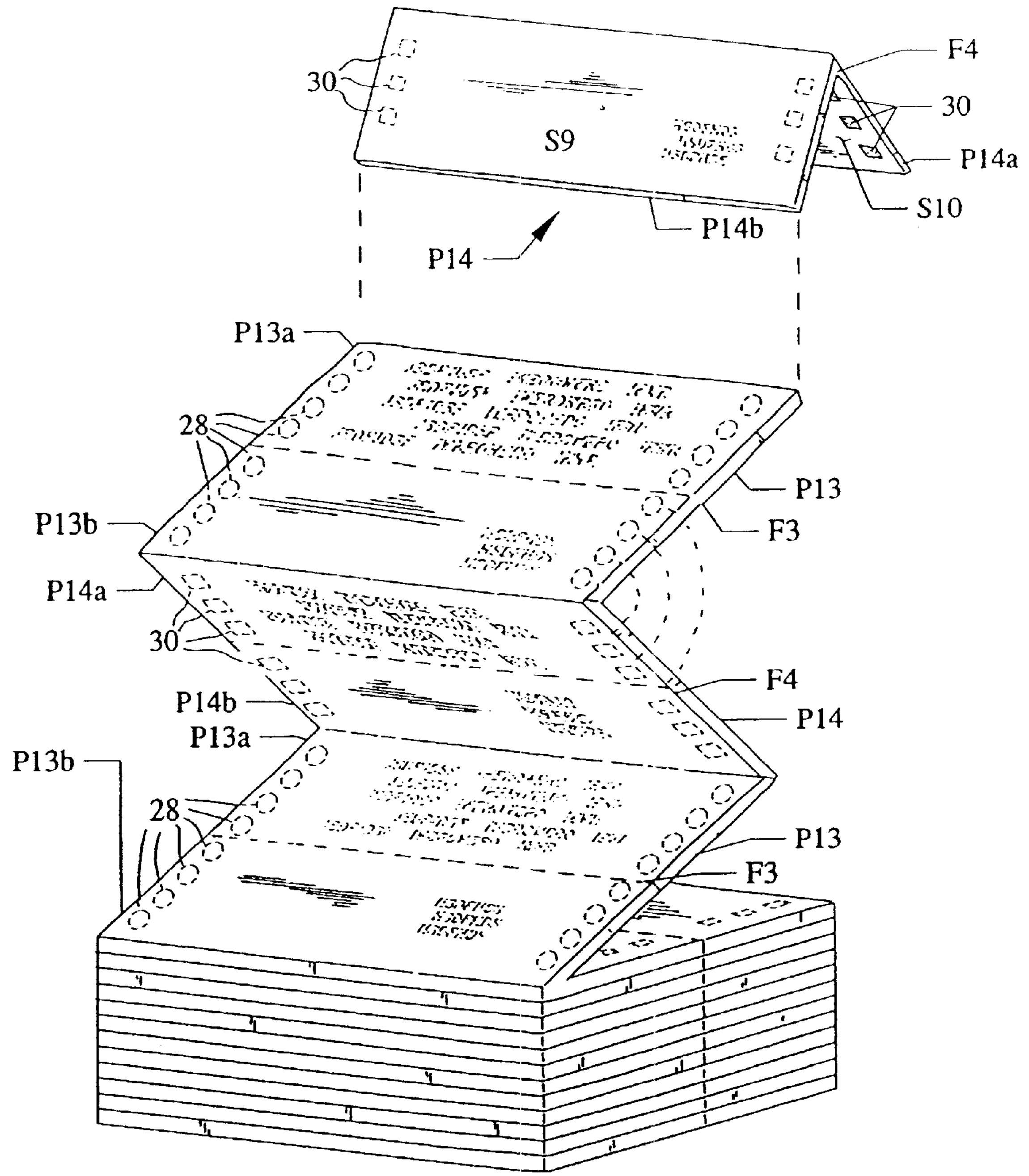
FIG. 5 is a perspective view of an interfolded stack comprising a series of two ply documents, with a different contact adhesive pattern on each of the documents to preclude their adhesion while stacked, but providing for the sealing of the two plies of each document together.
Figure 6:
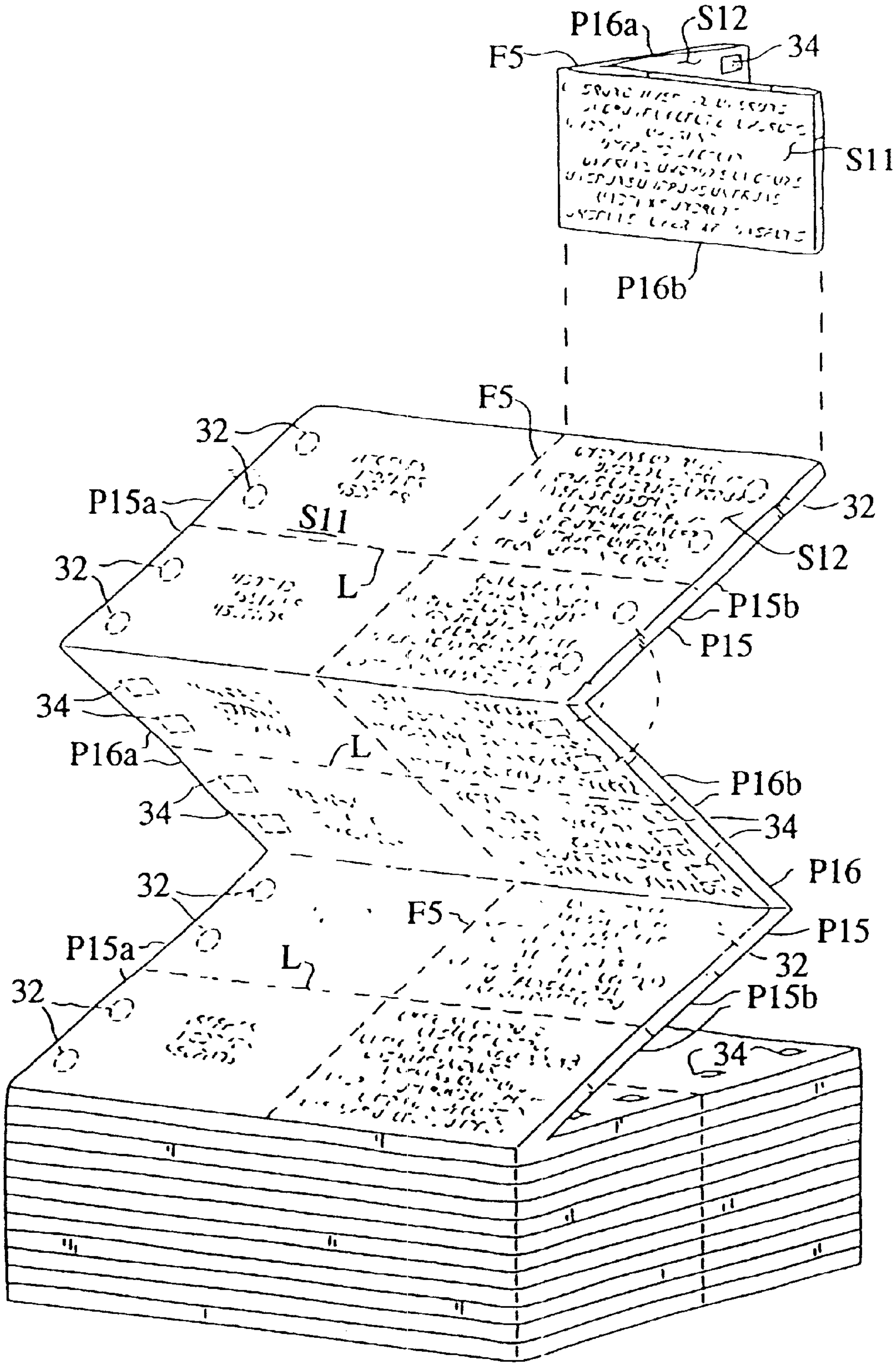
FIG. 6 is a perspective view of an interfolded stack showing an alternative means of forming a two ply document, and the adhesive patterns therefor.

FIGS. 5 and 6 disclose different embodiments of a single fold mailer or other document having two sheets when folded together to form a post card configuration. In FIG. 5, a plurality of alternating plies or sheets P13 and P14 having opposite first and second surfaces S9 and S10 are provided in a continuous feed, interfolded stack. Each of the sheets P13 is divided into two smaller portions P13*a* and P13*b* along a lateral fold line F3, with each of the sheets P14 being divided into portions P14*a* and P14*b* along a lateral fold line F4. As in the continuous feed sheets of FIGS. 1 and 2, each of the panels or sheets P13 and P14 is provided with a distinctive pattern of contact adhesive thereon, respectively

28 and 30. The two patterns 28 and 30 are applied to the second surface S10, in a configuration such that the patterns 28 and 30 are in non-registry with one another when the sheets P13 and P14 are stacked together, thereby precluding adhesion of the sheets.

However, each of the sub panels P13*a*/P13*b* and P14*a*/P14*b* have identical arrangements of the respective contact adhesive patterns 28 and 30 thereon. The portions of the pattern 28 distributed upon each of the sub panels P13*a* and P13*b* are in registration with one another when the panels P13*a*/P13*b* are folded over along the lateral fold line F3 so their second surfaces S10 are in contact with one another, and the same in registration alignment also occurs with the pattern 30 when the sub panels or sheets P14*a*/P14*b* are folded together along the fold line F4. The two different patterns 28 and 30 do not contact one another when the like surfaces S10 of each panel P13 and P14 are in contact with one another, as the patterns 28 comprise a series of eight spots evenly distributed near the lateral edges of each panel P13, while the patterns 30 comprise an evenly spaced series of six spots near each lateral edge of each of the panels P14. Thus, the adhesive spots of the patterns 30 will fall between the spots of the patterns 28 when the sheets P13 and P14 are folded together, as shown by the dashed arcs in FIG. 5.

The configuration of FIG. 5 allows the sheets or panels P13 and P14 to be fed through a printer and imprinted upon their first surfaces S9, with a message on the sub panels P13*a* and P14*a*. The remaining respective panels P13*b* and P14*b* may be imprinted with an address. The resulting documents may then be fed through a burster to separate the panels P13 and P14 from one another, and thence to a folder where the respective panels P13*a*/P13*b* and P14*a*/P14*b* are folded over along their lateral fold lines to form a post card configuration, with address on one side and message on the other.

As in the example of FIG. 2, preferably some means of differentiating between the contact adhesive patterns 28 and 30 should be provided, so the user of the present invention can readily determine which panels will adhere to which other panels when the panels are placed in registry with one another. This may be accomplished by coloring the two adhesive patterns 28 and 30 differently, as was described for the patterns 18 and 20 of FIG. 2, or by some other means. While the typical contact adhesive is virtually colorless and may be difficult to see when applied to the sheet stock panels, such adhesive may also have a uniform tint which stands out from the stock. If so, the different spot patterns 28 and 30 may be provided having different shapes for their respective spots, such as the round spots of the patterns 28 and square spots of the panels 30 shown in FIG. 5. It will also be understood that continuous contact glue or adhesive patterns may be provided in the example of FIG. 5, similar to those patterns 10 and 12 shown in FIG. 1.

The embodiment of FIG. 6 will be seen to be similar to that of FIG. 5, with the primary difference being the orientation of the fold to form the post card configuration. The finished documents of the FIG. 5 embodiment would be on the order of five and one half by eight and one half inches when formed from an eight and one half by eleven inch sheet, and would thus require standard postage if mailed. On the other hand, where a smaller message is all that is required, the present adhesive patterns may be used to form post card size documents only four and one quarter inches wide.

In FIG. 6, a plurality of alternating plies or sheets P15 and P16, each having a first or message surface S11 and an opposite adhesive surface S12, includes a vertical or longitudinal fold line F5 down the center thereof. Each sheet P15 and P16 is divided into two lateral portions, respectively P15*a*/P15*b* and P16*a*/P16*b*, by the fold line F5. Further, a lateral weakening line L (perforations, etc.), similar to the conventional separation line between each sheet in an interfolded array of continuous feed stock, is provided to divide each of the panels or sheets P15*a*/P15*b* and P16*a*/P16*b* into smaller sub panels. (While only one separation line L is shown in FIG. 6 for clarity in the drawings, it should be noted that additional separation lines L may be provided, i.e., two in each panel, to provide three laterally separated documents each having a height of three and two thirds inches.)

A first contact adhesive pattern 32 is applied to the second surface S12 of the first sheets P15 and a second pattern 34 applied to the second surface S12 of the second sheets P16. The patterns 32 and 34 are not in registry when the sheets P15/P16 are folded together in a conventional interfolded array, as indicated by the dashed arcs in the right side of the figure. However, the left and right edges of the respective patterns 32/34 are in registry with one another, when the sheets are folded along the longitudinal fold line F5. With an address printed on each of the P15*a*/P16*a*portions and a message on the laterally opposite P15*b*/P16*b* portions, the P15*a*/ P15*b*/P16*a*/P16*b* portions may be separated laterally and folded longitudinally to make the final cards, as at the top of FIG. 6.

Figure 7:
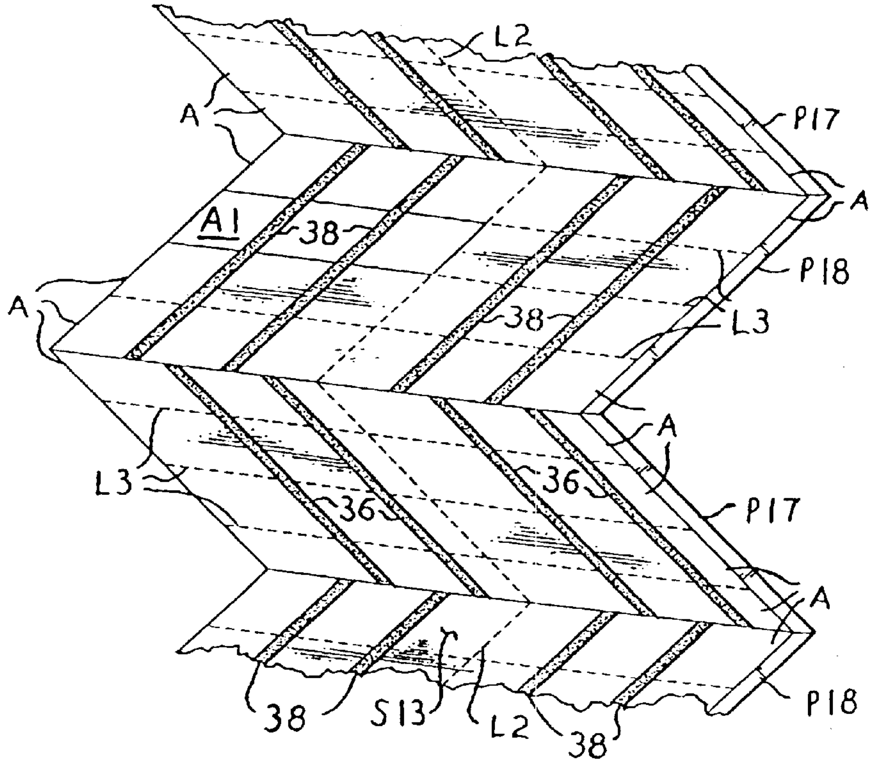
FIG. 7 is a perspective view of an adhesive pattern which may be used in the printing of address labels on interfolded stock.
Figure 8:
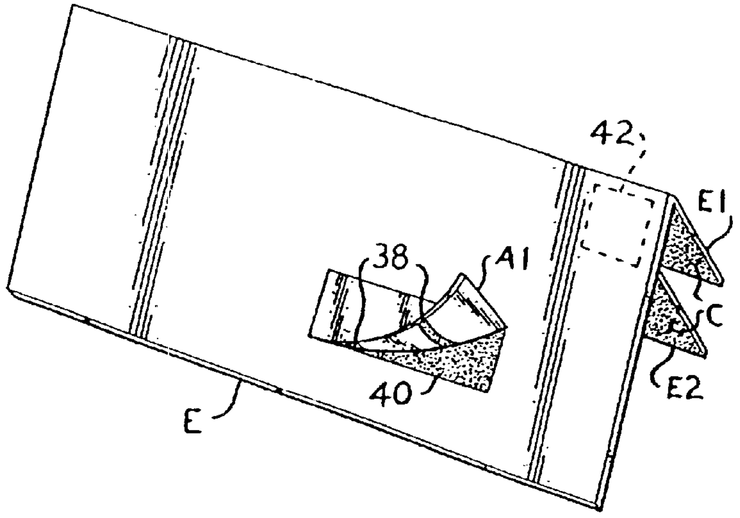
FIG. 8 is a perspective view of an envelope adapted for an address label of FIG. 7, and a label being secured thereto.

The present offset contact adhesive patterns may also be used to provide for the adhesion of address labels to an envelope suitably configured, as shown in FIGS. 7 and 8. In FIG. 7, a continuous feed interfolded stack of address labels A is provided, with longitudinal and lateral separation lines L2 and L3 therebetween. The interfolded stack is divided into alternating separate panels or sheets P17 and P18, each having a different contact adhesive pattern, respectively 36 and 38, on the back surface S13 thereof. As a plurality of address labels A may be provided in the length of a single sheet P17 or P18, the adhesive patterns 36 and 38 provided for such use may be applied in the form of continuous longitudinal bands or strips of adhesive along each of the sheets P17/P18, thus assuring that each address label A will have contact adhesive distributed on the back surface S13 thereof.

The pattern 36 applied to the sheets P17 is laterally offset from the pattern 38 of the sheets P18, thus assuring that each adhesive strip 36/38 will contact only the facing back surface S13 of the sheets P17/P18 when the sheets are interfolded together. The configuration is thus similar to the marginal portions of the adhesive patterns 10 and 12 disclosed in FIG. 1. If a suitably configured envelope E having an address label area 40 comprising an unbroken coating of contact adhesive is provided, as shown in FIG. 8, any of the address labels A, regardless of their original location on the sheets P17/P18, may be applied, with the adhesive pattern (e.g., the pattern 38 of the address label A1, outlined in solid lines in FIG. 7) may be applied.

The above described adhesive pattern configuration for address labels is particularly well suited for use with envelopes E which are provided with pre-applied contact adhesive material C on each of the back flaps E1 and E2. The contact adhesive patch 40 may be applied at the time of the application of the other contact adhesive material C to those flaps E1 and E2. In addition, it will be seen that an optional contact adhesive area 42 (shown in broken lines) may be provided in the upper right corner of the envelope E, for a suitably configured postage stamp (not shown). Such a stamp may be printed in sheets, with the mating contact adhesive applied similarly to the arrangement described above for the address labels A. Such an arrangement would be much neater and cleaner than the conventional moisture activated glues used presently.

It should be noted that the present offset contact adhesive pattern invention may include innumerable different patterns, so long as the two patterns of any facing sheets are offset from one another to preclude those sheets adhering together while interfolded or stacked in storage. FIGS. 9A through 9D provide a few examples of various patterns which might be used.

Figure 9A:
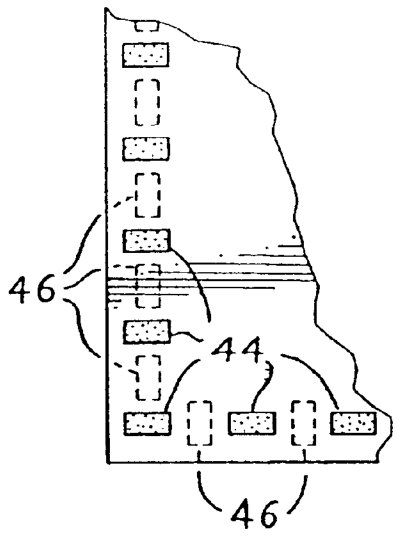
FIGS. 9A through 9D are plan views of various different possible adhesive patterns on opposite surfaces of single sheets, or on corresponding surfaces of adjacent sheets.

In FIG. 9A, a series of alternatingly oriented rectangular adhesive spots 44 (in solid lines, on the front of the sheet) and 46 (in broken lines, on the back of the sheet or on another facing sheet) are provided. Such different orientations will make the different patterns readily noticeable to a user of materials provided with the patterns of the present invention, whether distinguished by color or only by their shape.

Figure 9B:
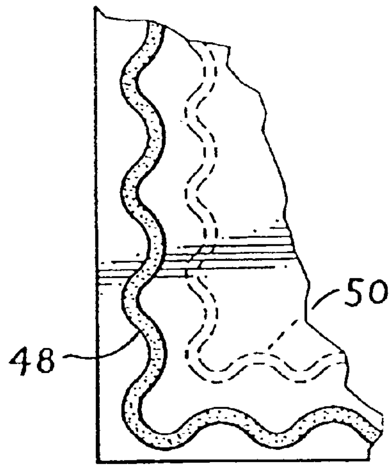

In FIG. 9B, a continuous sinusoidal pattern 48 is placed upon the front side of the sheet, as shown in solid lines, and a corresponding but offset sinusoidal pattern 50 is placed upon the opposite side of the sheet or on a facing sheet, as shown in broken lines. The sinusoidal patterns may be used to provide a somewhat longer glue path for the size of the sheet perimeter for additional adhesive security, if desired. Various other continuous patterns may be provided (geometric zigzag patterns, etc.), as desired.

Figure 9C:
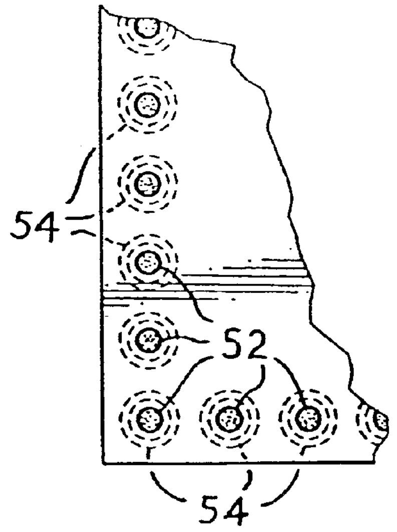
Figure 9D:
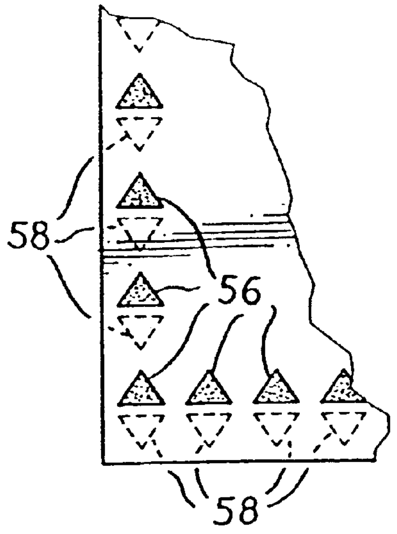

FIG. 9C discloses a configuration wherein a series of evenly spaced adhesive round dots or spots 52 is provided on one face of the sheet, with a corresponding series of concentric circular adhesive rings 54 being placed up on the opposite face of the sheet, or the adjacent face of another sheet. In such an arrangement, so long as the dot-to-ring or ring-to-dot relationship is maintained, the two sheets can never adhere to one another, regardless of their orientation. However, when the sheets are arranged to have a dot-to-dot or ring-to-ring facing relationship, the sheets will automatically adhere to one another.

In FIG. 9C, a plurality of evenly spaced apart triangular adhesive shapes are provided, with the first triangles 56 disposed upon the first surface of the sheet having their apices pointed in a first direction on the sheet, while the second triangles 58 disposed upon the opposite surface of the sheet or on another facing sheet have their apices pointing opposite those of the first triangles 56. These two triangular adhesive patterns 56 and 58 are offset from one another, but if one sheet having triangular adhesive patterns 56 is inverted and turned from top to bottom relative to another sheeting having triangular adhesive patterns 58 thereon, the two patterns 56/58 will be congruent with one another, to allow the upright and inverted sheets to adhere to one another.

The above described variations of contact adhesive patterns will be seen to be but a small number of those possible, and are provided as examples of the innumerable adhesive patterns which may be formed. Such patterns may preclude adhesion of adjacent sheet surfaces when the sheets are both upright, but may be disposed to provide congruency of the patterns when one sheet is inverted or turned over from left to right, relative to another sheet, as in the example of FIG. 9D. On the other hand, the configurations of FIGS. 9B and 9C assure that no contact will occur between sheets having the different patterns disposed thereon, regardless of their orientation with one another. Any of the above patterns or others, may be used, depending upon the needs of the user.

The above examples describe only the selective adhesion, or the precluding or adhesion, of one sheet of material (which is expected generally to be paper, as in the printing process, but which may be plastic, metal foil, or other sheet material) relative to another. However, in some circumstances an additional sheet having no adhesive thereon may be run through the printing process with the adhesive sheets, and separated after printing to provide a file copy, as in the processing of a check and cover sheet to form an envelope mailer. The non-adhesive sheet may be retained as a record of the transaction.

Figure 10:
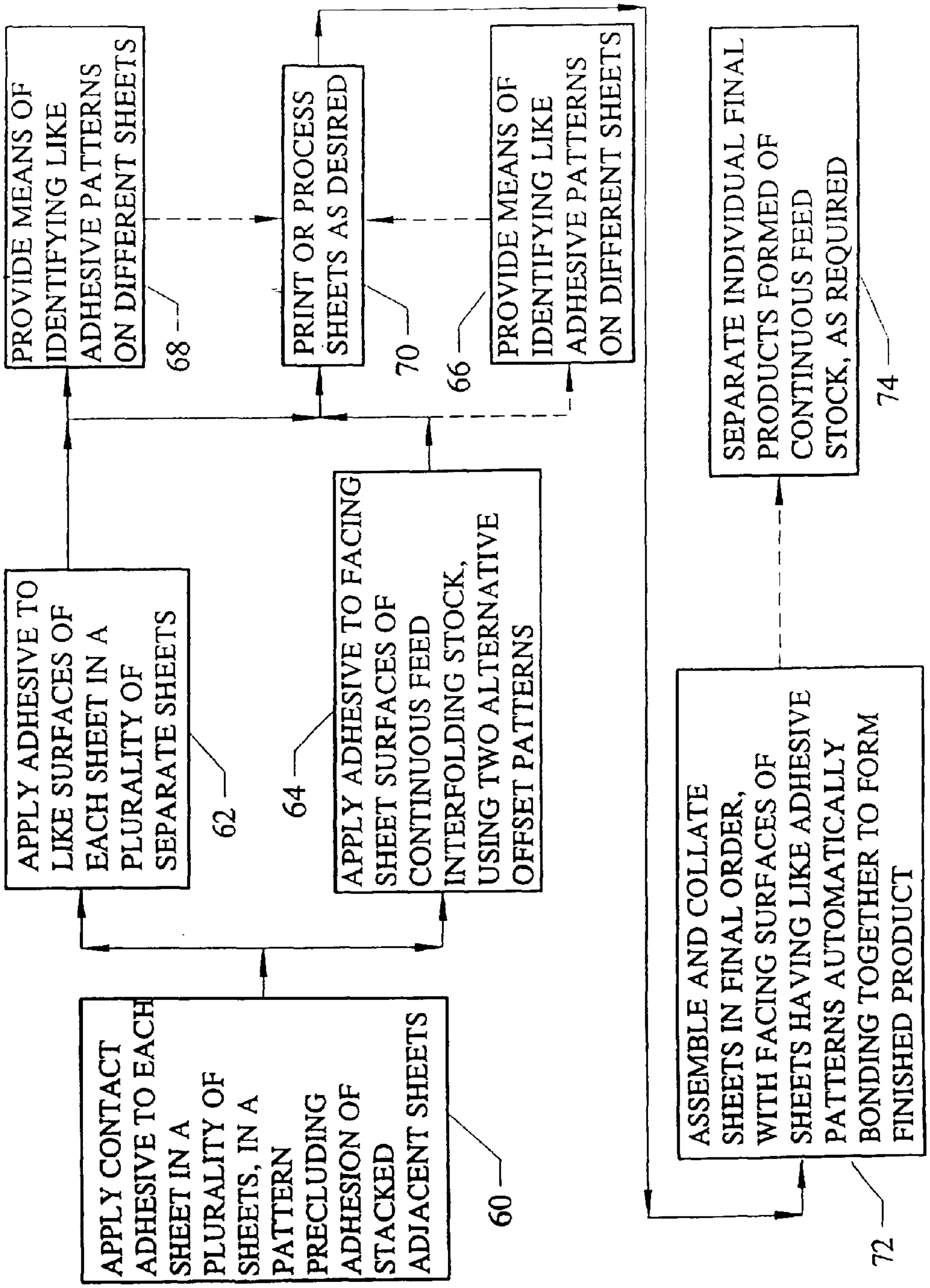
FIG. 10 is a flow chart disclosing the steps in the method of forming plural ply documents using the present staggered contact adhesive pattern invention.

The present invention of the application of various contact adhesive patterns to sheet stock in order to preclude adhesion of adjacent sheets while stacked in storage, lends itself to a method of use, as disclosed generally in the flow chart of FIG. 10.

Initially, a number of sheets of material (paper, plastic, foil, etc.) are provided, and a contact adhesive (i.e., adhesive capable of adhering only to a like adhesive material) is applied to each of the sheets, with the adhesive being applied in a different pattern or patterns between adjacent faces of the sheets. This results in the adhesive patterns being offset or staggered from one another on adjacent sheets, thus precluding their contact and adhesion to one another when the sheets are stacked in registry with one another. This first step is generally described in the first block 60 of the flow chart of FIG. 10.

The present contact adhesive pattern invention is adaptable to use with continuous feed interfolded sheets, where the same face is in contact on adjacent sheets (i.e., front to front, and back to back), or with separate sheets, in which they are stacked with the same orientation of like faces throughout the stack (i.e., front to back, and back to front). The alternative block 62 of FIG. 10 generally describes the application of an identical contact adhesive pattern(s) to like surfaces of each sheet of a plurality of separate sheets. That is to say, all of the front surfaces have an identical pattern, and all of the back surfaces have an identical pattern different from that of the front surfaces, if adhesive is applied to the back surfaces of the sheets.

Alternatively, the application of offset adhesive patterns may be used with interfolded sheets, as described generally in the alternative block 64 of FIG. 10. Here, a first adhesive pattern is applied to the first or front surface of every other sheet (first, third, fifth, seventh, ninth, etc.), with each of the alternating sheets having an identical adhesive pattern. A second adhesive pattern is applied to the first or front surface of each of the remaining sheets (second, fourth, sixth, eighth, tenth, etc.), with that second pattern being identical on each of these remaining sheets.

It will be seen that such interfolded sheets may also be provided with adhesive patterns disposed upon their back surfaces, to provide for the securing together of more than two sheets, as desired. In such an embodiment, the same adhesive pattern applied to the front surfaces of each sheet may be applied to the back surfaces of the same sheets, as these patterns alternate and the front surface of one sheet does not come in contact with the back surface of an adjacent sheet in an interfolded, continuous feed array. However, each sheet may be provided with a first pattern on the front surface thereof, and a different second pattern on the opposite surface thereof, so long as the patterns are different between facing surfaces of adjacent sheets to preclude adhesion of those sheets to one another when they are stacked together in a continuous feed, interfolded array.

With the continuous feed interfolded sheet stock described above, requiring two different adhesive patterns, some means of distinguishing the patterns from one another would be most helpful. Most contact adhesives are clear to a slightly yellow translucent color, and do not show up well when applied to many materials. Accordingly, dyes may be added to different supplies of the adhesive, with one color of the adhesive being used for one pattern, and another color being used for another pattern. Alternatively, if the contact adhesive is readily visible when applied to the sheets, some different geometrical shapes (circles vs. squares, etc.) may be applied to the patterns in order that they may be distinguished from one another. This alternative step is shown in the block 66 of FIG. 10. In the event that both sides of separate sheet stock are provided with contact adhesive patterns, the same means may be used to distinguish those different patterns, as indicated in the optional block 68 of FIG. 10.

At this point, the sheets may be fed through a printer to imprint graphics and/or text on one or both surfaces of each of the sheets as desired, as indicated generally in the block 70 of FIG. 10. In the case of separate sheets of material, the sheets may be fed from a bin or other supply source. With continuous feed stock, the sheets may be fed through a tractor drive for the printer and/or other equipment, by means of the conventional sprocket hole margins provided with such continuous feed material. (As noted elsewhere in the present disclosure, these conventional sprocket feed margins are not shown in the drawings, to reduce clutter.)

Once the various sheets have been printed, they may be assembled and collated as desired, with sheets having like adhesive patterns on facing surfaces automatically adhering to adjacent sheets, with no additional gluing equipment being required. This step is described generally in block 72 of FIG. 10. If one or more of the sheet sis provided with some form of duplication means, as in the no carbon required sheets imprinted by pressure through an adjacent sheet(s), then the sheets may be assembled and collated before being fed through the printer. In any case, the associated collating/folding/posting equipment for mailing/ etc. is generally a part of conventional equipment already in place in such printing operations, and no additional costly, maintenance intensive gluing machinery need to added to the system when the present contact adhesive patterns are applied to sheets to be assembled together.

When separate, individual sheets are used, the above described step of assembly and collation is the final step in the process, with no additional gluing or the like being required. In the case of continuous feed stock, the two or more sheets which have been assembled to form the final document may still be unseparated, in which case they may be fed through a burster, which separates the continuous feed multiple sheet documents into individual documents. Such a burster may also be used to separate plural documents printed on a single sheet or on continuous feed stock, as in FIGS. 2, 5 and 6, and/or address labels printed on a sheet, as in FIG. 7. This step of separating the documents is described generally in the optional final block 74 of FIG. 10.

Figure 11:
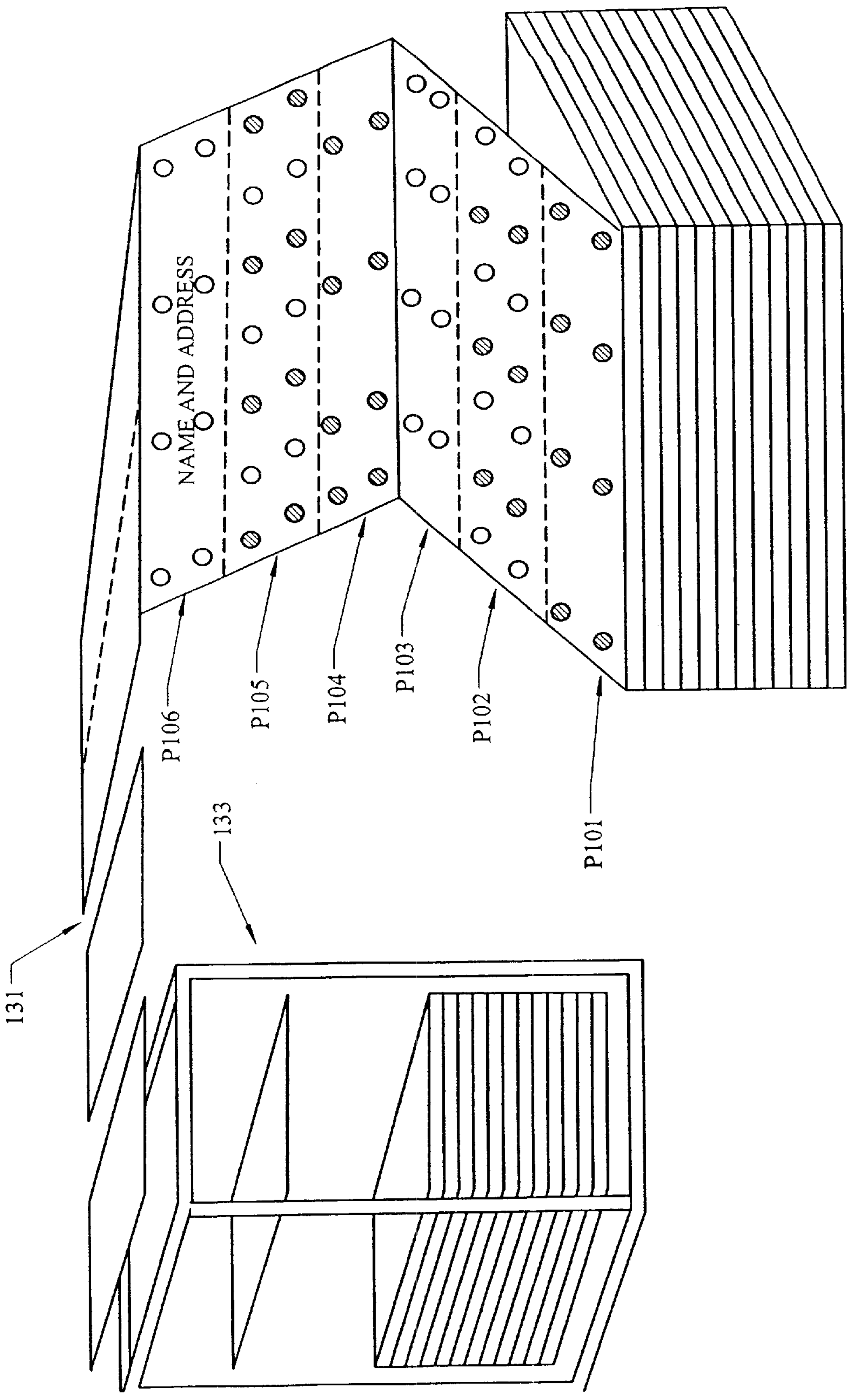
FIGS. 11 and 12 are perspective views showing embodiments of the invention in which a multi-part mailing piece is made from a single continuous web of forms.
Figure 12:
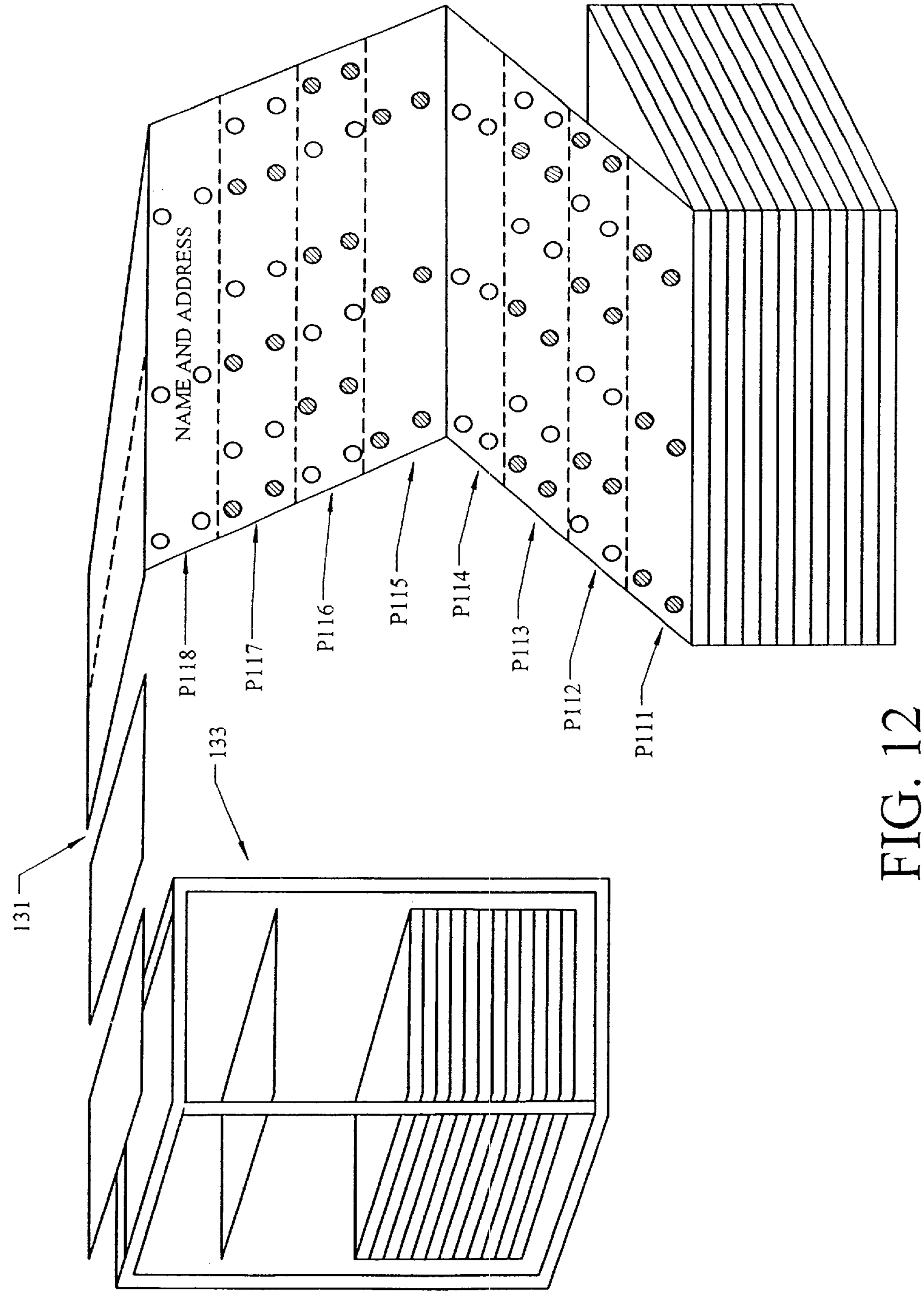

FIGS. 11 and 12 show embodiments of the invention in which a multi-part mailing piece is made from a single continuous web of forms. FIG. 11 shows an embodiment wherein a continuous web of 8½×11 sheets is used. Each sheet comprises three parts, each of which is 3⅔ inches in height, with perforations (shown as a dotted line in the drawings) between parts. As shown in FIG. 11, a first sheet comprises parts P101, P102, and P103, while a second sheet comprises parts P104, P105, and P106. FIG. 12 shows an embodiment wherein a continuous web of 14-inch sheets is used. In this embodiment, each sheet comprising four parts, each of which is 3½ inches in height; a first sheet in FIG. 12 comprises parts P111 through P114, while a second sheet comprises parts P115 through P118.

In FIGS. 11 and 12, adhesive patterns are shown as circles on each part of a sheet, with shaded circles representing adhesive patterns on the front face of the sheet and unshaded circles representing adhesive patterns on the back face of the sheet. As can be seen from close examination of the drawings, when the continuous web is fan-folded in a stack, the adhesive patterns of a first sheet do not register with the adhesive patterns of the adjacent sheets. Thus, a one-part continuous single web could be made into a two-part or more multiple part mailing piece with virtually any number of parts and virtually any size from fold to fold.

The continuous web is unfolded and fed into a burster and each part is burst at its perforations at a bursting point 131 in the burster. The burst parts are then fed to a stacking means (shown schematically at 133), which preferably comprises a high-capacity stacker. The parts are sequentially stacked in the stacking means 133, with succeeding parts preferably being stacked on top of preceding parts.

Because of the arrangement of the adhesive patterns, adhesive patterns of adjacent parts of a mailer do register with each other when the parts are stacked in the stacker. For example, the adhesive pattern on the back face of part 106 will register with the adhesive pattern on the front face of part 105, and the adhesive pattern on the back face of part P105 will register with the adhesive pattern on the front face of part P104.

Various types of stacking means 133 may be used. For example, a free-fall drop stacker, a high-capacity stacker, a conveyor stacker, or gathering rollers may be used. Free-fall drop stackers drop sequential parts one on top of another, forming a stack in a stacking area which is emptied from time to time by an operator. Because the placement of sequential parts is relatively uncontrolled, the stack ordinarily must be "squared up" either by hand or by use of a registration means such as a stack vibrator. High-capacity stackers use belts, rollers, or other means to place sequential parts one on top of another without a period of free-fall, and this controlled placement ordinarily results in a stack which is well-registered and does not require other registration means. In a conveyor stacker, parts from a burster or other upstream device are ordinarily received on a conveyor belt in an overlapping configuration and are transported to a "stop" at an end of the conveyor belt, where parts are accumulated into a stack. Once all parts for a particular mailer are gathered, they are ordinarily discharged for further processing.

The stacking means may also be in the form of gathering rollers featured, e.g., at the output of the burster. Such gathering rollers receive and collate two or more parts as they exit a burster (or other processing device). Gathering rollers ordinarily operate synchronously with a burster. Once the parts of a particular mailer are collected they are discharged by a pair of discharge rollers prior to receipt of a the first part of a next mailer.

Preferably, the adhesive selected is a co-adhesive which is not tacky to itself. Thus, a sheet which is simply dropped on top of an adjacent sheet having a matching adhesive pattern does not bond to the adjacent sheet. However, when a pressure in excess of, e.g., 10 pounds is applied to the stack, bonding of adjacent sheets having matching adhesive patterns occurs. Co-adhesives which may be used to provide such bonding properties include, e.g., various co-adhesives similar to those used in self-seal envelopes including but not limited to latex or other self-contact material. The formulation of the particular adhesive selected depends on the bonding strength, resistance to heat (as in fuser oil in laser printers), or other properties which are desirable for the specific application to which the invention is applied.

It should be noted that even when such adhesive is used, facing sheets in a stack which is stored for an extended period of time may bond with each other. And, it is for this reason that adhesive patterns of facing sheets in a stacked continuous web are made non-registrable with each other, as is shown in FIGS. 11 and 12.

Various means for applying pressure to stacked parts, in order to seal a mailer, may be used. For example, if a free-fall drop stacker, high-capacity stacker, or conveyor stacker is used, one might elect to have an operator apply pressure manually by firmly pressing the edges of a stack or single collected mailer. If gathering rollers are used, the discharge rollers may be used to apply pressure sufficient to seal the mailer. A skilled artisan will recognize that other means for applying pressure are known in the art and such means may be selected according to the particular application and type of stacking means used.

It should be noted that the outer parts of a sheet, e.g., parts P11 and P14 in FIG. 12, may be provided with a adhesive pattern on only one side as shown in FIGS. 11 and 12. In this manner, when pressure is applied to a stack of parts, parts which make up a first mailer do not adhere to adjacent parts which make up a second mailer. That is, part 104, which is part of a first three-part mailer, does not adhere to part 103, which is part of a second three-part mailer, because part 103 has no adhesive pattern on its front face.

While FIG. 11 shows a web which is fan-folded every 11 inches and perforated to produce 3-part mailers, and FIG. 12 shows a web which is fan-folded every 14 inches and perforated to produce 4-part mailers, it will be understood by those skilled in the art that other form lengths and numbers of parts per mailer could be provided without departing from the spirit and scope of the invention.

In summary, the present invention of contact adhesive patterns applied to sheet material, and precluding adhesion of the sheets when stacked for storage before processing, provides a significant advance in the field of printing various smaller documents comprising two or more sheets of pages. Heretofore, complex and expensive equipment was required, either to apply glue to the sheets are they were processed, or to activate the previously applied glue by moisture, heat, or pressure, as applicable. Contact adhesives which would obviate the need for such equipment had not been used, because the identical application of such contact adhesive to a plurality of sheets would result in the sheets being bonded together as a solid mass before printing.

The present offset or staggered contact adhesive patterns precludes such adhesion before use, and yet allows any number of suitably prepared sheets to be bonded together during or immediately following the printing process, merely by rearranging the sheets in some order or orientation to allow the contact adhesive patterns to be in registry with one another when the sheets are so arranged in registry, e.g., by assembling every other sheet with one another, or inverting alternating sheets, etc.

While the present invention is directed to the provision of contact adhesive patterns on sheet material, it will be seen that additional sheets having no adhesive applied thereon, may be crimped or otherwise temporarily secured to the contact adhesive sheets, with the non-adhesive sheets being separated after printing to provide a file copy/copies for the originator of the documents.

The present invention thus serves to free those involved with the printing and processing of various documents, such as checks, mailers, invoices, etc., as well as other plural sheet articles, from the need for additional expensive equipment, and thus provides a reduction in the cost of preparing and processing such materials. The cost savings when considered over perhaps tens of thousands of documents, is substantial, and will provide businesses with a significantly more efficient means of producing such documents which can only be beneficial to their financial bottom lines and to their customers.

It is to be understood that the present invention is not limited to the sole embodiments described above, but encompasses any and all embodiments within the scope of the following claims.

What is claimed is:

1. A method of manufacturing sheet material for production of completed documents having plural plies, comprising the steps of:

providing a continuous web of material having a plurality of sequential parts, said plurality of sequential parts comprising a first part having a first and a second surface and a second part adjacent to said first part having a third and a fourth surface; and, applying contact adhesive to at least said first and second parts in patterns which preclude adhesive contact and bonding of facing sheets when said web is interfolded but which provide adhesive contact and bonding of said first and second parts when said first and second parts are separated and sequentially stacked, said patterns being spaced apart from and generally parallel to the periphery of said first and second parts, said patterns further being positioned so as not to cross any perforation or tear line separating said first and second parts.

2. The method according to claim 1, further comprising the steps of:

printing said plurality of sequential parts;

separating said sequential parts from each other;

stacking said sequential parts to form a stack of parts having succeeding parts on top of preceding parts;

applying pressure to stacked parts, whereby said stacked parts bond together to form a mailer.

3. The method according to claim 2, wherein said separating step comprises bursting sequential parts.

4. The method according to claim 2, wherein said step of applying pressure comprises a step of applying pressure in excess of 10 pounds to a surface of at least one of said stacked parts.

5. The method according to claim 2, wherein said step of applying pressure comprises a step of pinching multiple parts between rollers.

6. The method according to claim 5, wherein said pinching step comprises pinching parts between discharge rollers.

7. The method according to claim 2, wherein said step of applying pressure comprises manually pressing the edges of said stack of parts.

8. The method according to claim 2, wherein said stacking step comprises using a high-capacity stacker.

9. The method according to claim 2, wherein said stacking step comprises using a conveyor stacker.

10. The method according to claim 2, wherein said stacking step comprises using a drop stacker.

11. The method according to claim 2, wherein said stacking step comprises using gathering rollers.

12. The method according to claim 1, wherein said step of applying adhesive comprises a step of applying adhesive to said first, second, third and fourth surfaces.

13. A method of manufacturing sheet material for production of completed documents having plural plies, comprising the steps of:

providing a continuous web of material having a plurality of sequential parts, said plurality of sequential parts comprising a first part having a first and a second surface and a second part adjacent to said first part having a third and a fourth surface; and, applying contact adhesive to said first, second, third and fourth surfaces in patterns which preclude adhesive contact and bonding of adjacent facing when said web is interfolded but which permit adhesive contact and bonding of adjacent parts when said plurality of sequential parts are separated and sequentially stacked, said patterns being spaced apart from and generally parallel to the periphery of said first and second parts, said patterns further being positioned such that adhesive is not incident to any perforation or tear line separating said first and second parts.

14. A method of manufacturing sheet material for production of completed documents having plural plies, comprising the steps of:

providing a continuous web of material having a plurality of sequential parts, said plurality of sequential parts comprising a first part having a first and a second surface, a second part having a third and a fourth surface, and a third part having a fifth and a sixth surface, said second part being located between said first part and said third part along said continuous web; and, applying contact adhesive to said second, third, fourth and fifth surfaces in patterns which preclude adhesive contact and bonding of adjacent facing surfaces of the parts when said web is interfolded but which permit adhesive contact and bonding of adjacent parts when said plurality of sequential parts are sequentially stacked, and applying no adhesive to said first and sixth surfaces, whereby when pressure is applied to a separated and sequentially stacked stack of parts, a first mailer that includes said first, second, and third parts does not adhere to adjacent parts which are associated with other mailers, said patterns being spaced apart from and generally parallel to the periphery of said first and second parts, said patterns further being positioned such that adhesive is not incident to any perforation or tear line separating said first and second parts.

15. Sheet material for production of completed documents having plural plies, comprising:

a continuous web of material having a plurality of sequential parts, said plurality of sequential parts comprising a first part having a first and a second surface and a second part adjacent to said first part having a third and a fourth surface; and, contact adhesive applied to at least said first and second parts in patterns which preclude adhesive contact and bonding of adjacent facing surfaces of said first and second parts when said web is interfolded and said adjacent facing surfaces of said first and second parts are in registry but which permit adhesive contact and bonding of said first and second parts when separated and sequentially stacked, said patterns being spaced apart from and generally parallel to the periphery of said first and second parts, said patterns further being positioned such that adhesive is not incident to any perforation or tear line separating said first and second parts.

* * * * *